United States Patent [19]

Traut

[11] 3,937,536
[45] Feb. 10, 1976

[54] ROLLING CONTACT BEARING DEVICES

[76] Inventor: Earl W. Traut, P.O. Box 23776, Fort Lauderdale, Fla. 33307

[22] Filed: Nov. 9, 1973

[21] Appl. No.: 414,150

[52] U.S. Cl. ................................ 308/206; 308/200
[51] Int. Cl.² ........................................ F16C 23/08
[58] Field of Search ............ 308/201, 200, 206, 215

[56] References Cited
UNITED STATES PATENTS
3,655,251  4/1972  Evenson ............................ 308/206
FOREIGN PATENTS OR APPLICATIONS
21,882   3/1909   United Kingdom ................. 308/200
318,437  4/1928   United Kingdom ................. 308/200

Primary Examiner—M. Henson Wood, Jr.
Assistant Examiner—Richard A. Bertsch
Attorney, Agent, or Firm—Oltman and Flynn

[57] ABSTRACT

Radial and axial bearing devices in which loads are transmitted from a race through circularly disposed rotating elements which are positioned relative to the race by a second and possibly a third set of rotating elements which in turn are held in position by retainers, which also constitute the other bearing race. All of these elements are in rolling contact with one another, so friction is minimized. Some of the devices are simply bearings, others are capable of rolling contact speed changes, and yet others are capable of rolling contact oscillatory motion and torque transmission through gear teeth.

19 Claims, 20 Drawing Figures

ROLLING CONTACT BEARING DEVICES

BACKGROUND OF THE INVENTION

In typical ball or roller bearings, loads are transmitted from one bearing race through a series of rolling elements to a second bearing race. These rolling elements are in sliding contact with each other or with a cage, and the resulting friction is undesirable in that it causes wear and necessitates the provision of lubrication and internal clearances. In some bearings sliding friction is eliminated by providing one or two additional sets of rolling elements, as in U.S. Pat. No. 116,795 issued to B. C. Baker, U.S. Pat. No. 413,446 issued to R. W. Hent and U.S. Pat. No. 3,365,254 issued to A. L. Nasvytis; but these bearings are either excessively complex or their rotating elements move at excessive speeds.

SUMMARY OF THE INVENTION

The invention provides axial and radial load, rolling contact bearing devices including a bearing race, major rotating elements engaging the inner surface of this bearing race, minor rolling elements for positioning the major rolling elements, and retainers for positioning at least the minor rolling elements. The retainers also function as a second bearing race. All of these elements are in rolling contact with each other.

In some embodiments there is a central shaft, but it does not contact the rolling elements. In other embodiments there is no central shaft. The contact between the rolling elements may be either rolling point contact as a ball riding on a flat surface, or rolling line contact as a cylinder rolling on a flat surface. By providing major rolling elements of different sizes, eccentric rotation of the outer race can be obtained. Each set of rolling elements may be comprised of two or more elements. Where more than two rolling elements are used, the major rolling elements may be provided with axial extensions which roll on one side of a retaining ring, and the minor rolling elements may be provided with axial extensions which ride on the other side of the same retaining ring. Torque can be transmitted between the rotating elements by permitting radial loads to be transmitted between elements in rolling contact and torque loads to be transmitted through gears at each rolling contact which is required to transmit torque.

Accordingly, it is an object of the present invention to provide an improved rolling contact bearing without sliding friction.

Another object of the invention is to provide a rolling contact bearing wherein there are zero clearances between components, thus providing for exact centering of rotating elements with zero displacement due to clearances.

A further object of the invention is to provide a rolling contact device wherein speed ratios between rotating elements ranging from infinitely small to infinitely large can be obtained without sliding friction and without clearance between the elements of the device.

Another object of the invention is to provide oscillatory or crank motion between elements which are in rolling contact only.

A still further object of the invention is to provide a rolling contact device including gears affixed to its elements to transmit torque loads.

Other objects of this invention will appear from the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Figures 1, 2:
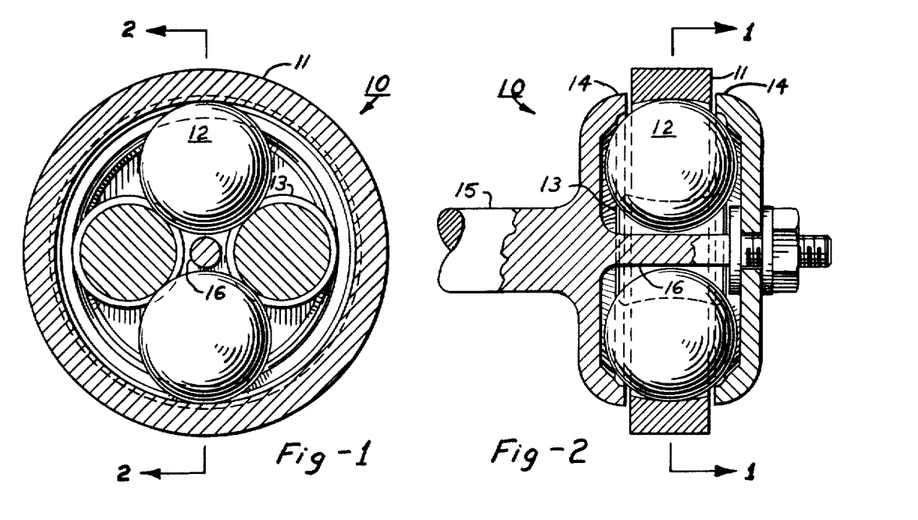
FIG. 1 is a vertical sectional view of a radial load rolling contact bearing using two sets of rolling elements each consisting of two rolling elements in accordance with one embodiment of the invention.
FIG. 2 is a sectional view taken along line 2—2 of FIG. 1 and looking in the direction of the arrows.

Turning now to FIGS. 1 and 2, there is shown a rolling contact radial load bearing 10 including an outer race 11 which contacts two balls 12 on its inner periphery. Balls 12 are held radially outwards against race 11 by the radially inward action of two spools 13. Spools 13 are held radially inward by two grooved retaining rings 14, one of which is integral with central shaft 15 and the other of which is bolted to axial extension 16 of central shaft 15. Axial extension 16 does not contact balls 12 or spools 13. There are a total of eight contacts within bearing 10, and each of these is a rolling point contact; sliding friction is not present. It should be noted that the inner periphery of race 11 is spherical to accommodate slight axial loads and angular misalignment between race 11 and shaft 15. Note that the axis of each spool 13 lies radially outward of the plane 2—2 through the axes of balls 12.

Figure 3:
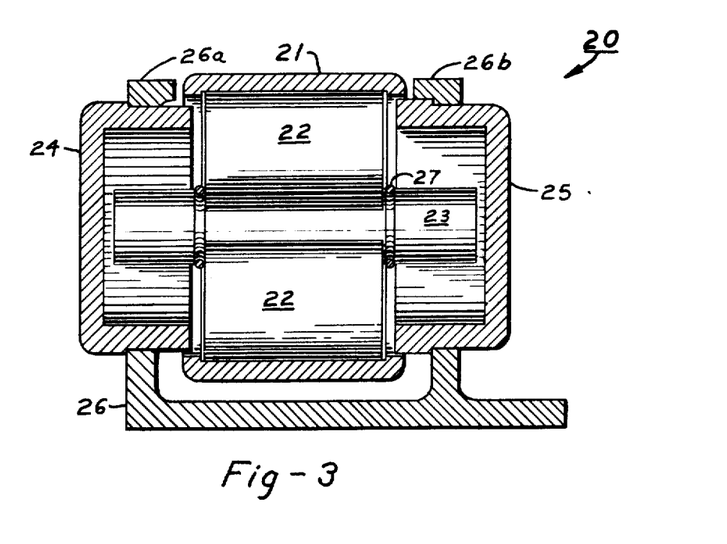
FIG. 3 is a vertical sectional view of a device similar to FIG. 1 in which rollers are utilized instead of balls.

The bearing 20 of FIG. 3 is similar to bearing 10 of FIG. 1 except it has no central shaft and rollers are utilized rather than balls. The bearing 20 includes a rotatable outer race 21 which contacts and rides on two cylindrical rollers 22. Rollers 22 are held against outer race 21 by two smaller rollers 23, the opposite ends of which ride on the inner periphery of retaining rings 24 and 25. The larger retaining ring 24 is pressed into the left end 26a of platform 26, and the smaller retaining ring 25 is pressed into the right end 26b of platform 26. Snap rings 27 prevent axial displacement. All contact is rolling line contact without sliding friction, and there is no central shaft.

Figure 4:
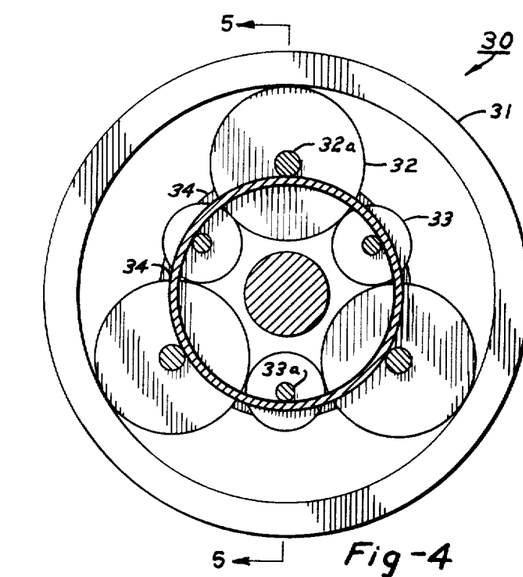
FIG. 4 is a vertical sectional view of a radial load rolling contact bearing utilizing two sets of rolling elements each consisting of more than two rolling elements in accordance with another embodiment of the invention.
Figure 5:
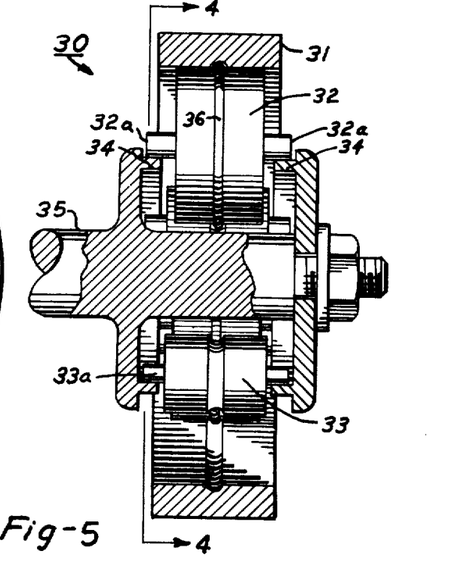
FIG. 5 is a sectional view taken along line 5—5 of FIG. 4.

Rolling contact bearing 30 depicted in FIGS. 4 and 5 is similar in concept to bearing 10 of FIGS. 1 and 2. In it, outer race 31 contacts a set of three large rollers 32 on its inner periphery. Rollers 32 are held in position by radially inward pressure from a second set of three smaller rollers 33 interposed between them. Note that the axis of each roller 33 lies radially outward of a plane between the axes of adjacent rollers 32. Rollers 33 are prevented from moving radially inwards by their contact with rollers 32 and are prevented from moving radially outwards by axial terete extensions 33a which roll along the inner periphery of the two rings 34. To preclude rollers 33 and rings 34 from shifting radially as a group, rings 34 are held in position by terete axial extensions 32a from both ends of rollers 32 which roll along the outer periphery of rings 34. One ring 34 is integral with shaft 35 and the other ring 34 is fastened to a central extension of shaft 35. Snap rings 36 fit into grooves on rollers 32 to preclude axial shifting.

It should be noted that rings 34 are at all times in rolling-contact with rollers 32 and 33, provided the dimensions of these components are according to this formula:

$$\frac{32L}{32S} = \frac{33L}{33S} \times \frac{34i}{34o}, \text{ where;}$$

32L = the overall diameter of roller 32 and 32s = the diameter of its axial projections, 33L = the maximum diameter of roller 33 and 33S = the diameter of its axial projections, $34_o$ = outer diameter of ring 34 and $34_i$ = inner diameter of ring 34.

One major variation of this device would be to use four or more rollers 32 and an equal number of rollers 33. Another variation would be to eliminate the central shaft joining the two rings 34. Yet another variation would be to use spools instead of rollers 32 and 33 to provide rolling point contact.

Figure 6:
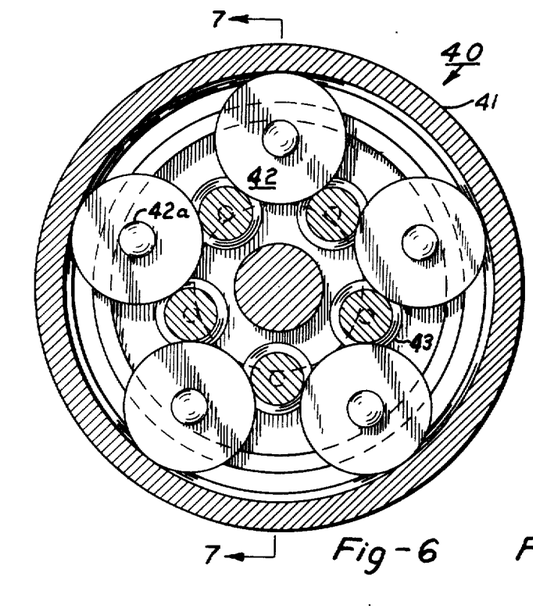
FIG. 6 is a vertical sectional view of a rolling contact bearing similar to FIG. 4, but in which a different geometry of rolling elements is utilized.
Figure 7:
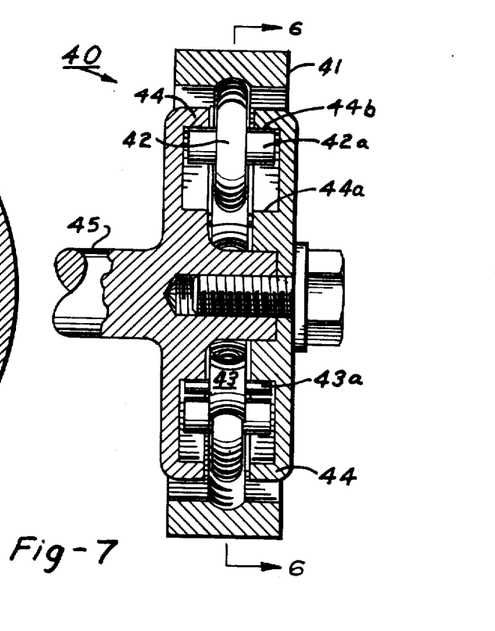
FIG. 7 is a vertical sectional view taken along the line 7—7 of FIG. 6.

Rolling contact bearing 40 shown in FIGS. 6 and 7 is similar to bearing 30 of FIGS. 4 and 5. It differs from it in that rolling point contact is depicted instead of rolling line contact, and in that the positioning of the smaller rollers is different and the action of the ring is different, as will be described. Outer bearing race 41 contacts a set of five large rollers 42 on its inner periphery. Rollers 42 are held in position by radially outward pressure from a second set of five smaller rollers 43 interposed between them. Note that the axis of each roller 43 lies radially inward of a plane between the axes of adjacent large rollers 42. Rollers 43 are prevented from moving radially outwards by their contact with rollers 42 and from moving radially inwards by axial terete extensions 43a which roll on inner hubs 44a of retaining rings 44. To preclude rollers 43 and rings 44 from shifting radially, they are held in position by terete axial extensions 42a of rollers 42 which roll along the inner periphery 44b of rings 44. Ring 44 is on one end integral with shaft 45; the other ring 44 is fastened to a central extension of shaft 45. There will be rolling contact at all points of contact if the previously cited formula is used; but in device 40, $44_i$ = hub diameter of ring 44 and $44_o$ = diameter of inner periphery of ring 44.

A variation of this device would be to use a different number of rollers 42, using this same number of rollers 43. Another variation would be to eliminate the central shaft joining the two rings 44; or a variation using rolling line contact as in device 30 would be possible. In a further variation of device 40 rolling elements 42 and 43 would be transposed; that is, concave rollers 43 would roll against the outer race and rollers 42 would be located radially inwards of them with their axial extensions 42a in rolling contact with inner hub 44a.

Figures 8, 9:
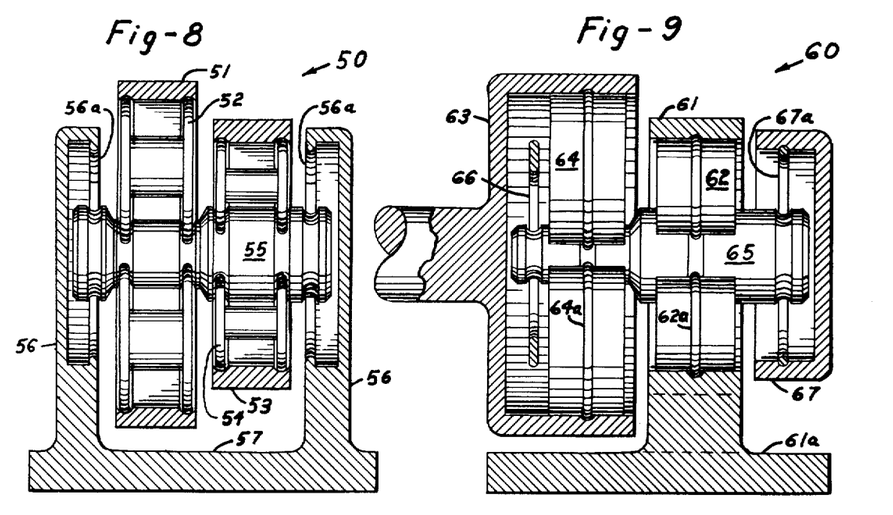
FIG. 8 is a vertical sectional view of a rolling contact device similar to FIG. 3, but in which speed changes are obtained.
FIG. 9 is a vertical sectional view of still another rolling contact device for obtaining speed changes in accordance with another embodiment of the invention.

In FIG. 8 a speed change device 50 using rolling point contact will be seen. Large ring 51 has grooves on its inner periphery in which two large spools 52 roll. Likewise, small ring 53 has grooves on its inner periphery in which two small spools 54 rotate. Spools 52 and 54 are held radially outwards against their respective rings by radially inward action of two rollers 55 which have grooves of proper diameters to insure contact therewith. Rollers 55 are contained in a radially inward position by rings 56a integral with end supports 56, which in turn are affixed to base 57. There is no central shaft. With the depicted dimensions, ring 53 will rotate at twice the speed of ring 51. Larger speed ratios can be obtained, but a principal advantage of this device is that very small yet precise, speed changes can be obtained with rolling friction, no sliding friction. As the groove diameter of ring 51 approaches that of ring 53 and the groove diameter of spool 52 approaches that of spool 54, the speed ratio between rings 51 and 53 decreases to zero.

FIG. 9 depicts another speed change device 60, this time using rolling line contact and with the capability of speed ratios from less than 1:2 to theoretically infinity. Device 60 is essentially what would be obtained by holding ring 53 of FIG. 8 stationary and permitting all other components to rotate. Returning now to FIG. 9, ring-shaped support 61 is stationary on platform 61a and has two small rollers 62 rolling along its inner periphery. Snap rings 62a in grooves in small rollers 62 also ride in grooves in support 61 and long rollers 65 to preclude axial slippage. Rotating ring 63 has an integral shaft and has an inner periphery upon which two large rollers 64 roll. Snap rings 64a in grooves in large rollers 64 preclude axial slippage. Two long rollers 65 press radially inwards between small rollers 62 and between large rollers 64. Long rollers 65 are held radially inwards at their thinner ends by rotating ring 66 and at their thicker ends by rotating ring 67, in which a snap ring 67a is provided to preclude axial slippage. With the depicted dimensions rotating ring 67 will rotate at over twice the speed of rotating ring 67 will rotate at over twice the speed of rotating ring 63. As the inside diameter of ring 63 increases and the thinner diameter of long rollers 65 increases (with a corresponding reduction in the diameter of large rollers 64), the angular velocity of ring 67 increases, theoretically to infinity.

Figure 10:
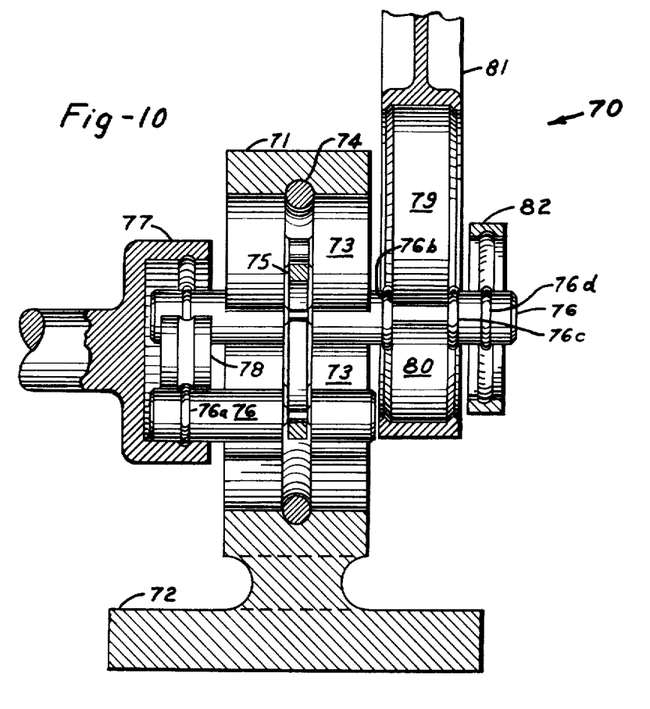
FIG. 10 is a vertical sectional view of a radial load rolling contact device wherein oscillatory or a crank motion is obtained.

FIG. 10 depicts device 70 wherein oscillatory or crank motion is obtained, all moving parts being in rolling line contact. Ring-shaped support 71 is stationarily affixed to base plate 72, and contacts three rollers 73 on its inner periphery. Rollers 73 are prevented from moving axially by snap ring 74. Axially in their middle, rollers 73 have a reduced diameter against which retaining ring 75 presses radially outwards to hold rollers 73 outwards against support 71. Three long rollers 76 act radially inwards between rollers 73 to also hold them radially outwards against support 71. Rollers 76 also have a reduced central diameter which rolls against the inside of retaining ring 76 and thus cannot move radially outwards. It will be seen that elements 71 through 76 operate the same as the elements of FIGS. 4 and 5, except that instead of using two retaining rings 34 acting at the ends of the six rollers in device 30, in device 70 a central retaining ring 76 holds the six rollers in position.

All three rollers 76 extend to the left in FIG. 10, where they contact ring 77 which rotates with them in rolling line contact. Idler roller 78 is centrally located between rollers 76 and contacts them at their left ends. Though not necessary to the operation of the device, roller 78 does help to hold rollers 76 in position and reduce their internal bending stress. Snap rings 76a on rollers 76 preclude axial slippage.

Two of the three rollers 76 are extended to the right in FIG. 10, where they are in rolling line contact with a large roller 79 and a small roller 80. Crank 81 contacts rollers 79 and 80 on its inner periphery and has lipped edges to preclude axial movement. Snap rings 76b and 76c are also provided. Crank 81 has the same inside diameter as support 71 and thus does not rotate but only oscillates eccentrically due to the action of rollers 79 and 80 and the displacement from center of the two extended rollers 76. Hence, crank 81 as drawn will remain perpendicular to base plate 72 and will not swing as a pendulum or as the crank in a typical reciprocating pump or engine. Ring 82 contacts the right ends of two of the rollers 76 to help hold them in position and snap ring 76d precludes axial movement.

It should be noted that all three rollers 76 could have been extended to the right, in which event two small, equal rollers 80 and one large roller 79 would provide osciallatory motion and the oscillatory displacement would have been reduced. Also a greater number than three each of rollers 73 and 76 could be employed. It should also be noted that by adding another set of rollers radially between the left ends of rollers 76 and ring 77, ring 77 can be caused to rotate at twice the oscillatory rate of crank 81, which would make it useful in certain pump/engine applications.

Figure 11:
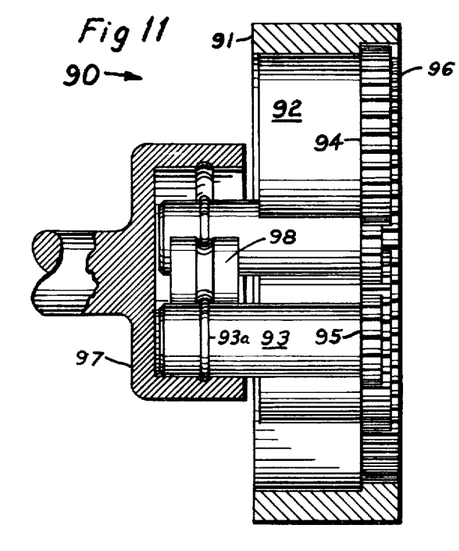
FIG. 11 is a vertical sectional view of a rolling contact device similar to FIG. 4, but in which gearing is utilized for positioning the secondary rollers and for transmitting torque.

FIG. 11 depicts another rolling-contact device 90 which is quite similar to device 30 in that there are three large rollers and three small rollers. However, it will be seen that instead of using retaining rings to hold the smaller rollers in position, gearing serves as retaining means. Thus, in FIG. 11, ring 91 contacts three large rollers 92 on its inner periphery. Three small rollers 93 with axes lying in the plane between the axes of adjacent large rollers 92, are prevented from moving radially inward or outwards by integral gears 95 at one of their ends which mesh with gears 94 which in turn are integral with or fastened to adjacent ends of rollers 92. Gear teeth 96 are provided on the inner periphery of ring 91 adjacent and meshing with gear teeth 94. Ring 91 in the figure containes 96 teeth; roller 92–36 teeth; and roller 93–16 teeth, but many other combinations of teeth numbers are possible. The left end of device 90 is quite similar to that of FIG. 10. Ring 97 has axial extensions of the three rollers 93 rolling along its inner periphery which have retaining rings 93a and a central roller 98 which rolls on the radially inward parts of rollers 93.

It will be seen that devices 10, 30 and 90 are simply rolling contact bearings whereas devices 50, 60 and 70 serve additional functions which include transmission of a certain amount of torque at many of the rolling contact lines. In many applications such line contact will be adequate to transfer the torque without slippage, particularly if negative clearance or press-fit installation is used. In applications where there is sufficient torque present to cause slippage, coaxial gears affixed to or integral with the elements in rolling contact at the locations of torque stress with it carry the stress torque load, just as the gears 94 and 95 through their action keep rollers 93 in position in device 90. When such gearing is used, all radial loads will be transmitted through the lines of rolling contact and all torque loads will be transmitted through bending forces on the teeth of the gears.

The same concepts used in the previously described radial load bearing devices are also applicable to axially oriented bearing devices as will now be shown.

Figure 12:
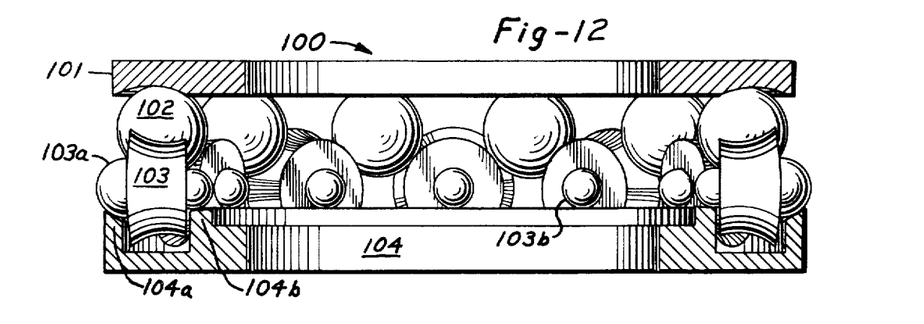
FIG. 12 is a vertical sectional view of an axial load rolling contact bearing using two sets of rolling elements each consisting of twelve rolling elements in accordance with another embodiment of the invention.

Rolling contact bearing 100 as shown in FIG. 12 is an axial load bearing wherein upper bearing race 101 contacts balls 102 which are interposed between rollers 103 and contact their broad central portions. The orbicular ends 103a and 103b of rollers 103 contact retainer rings 104a and 104b respectively. Rings 104a and 104b are integral with lower bearing race 104 and slope in opposite directions to preclude radial movement of rollers 103.

Figure 13:
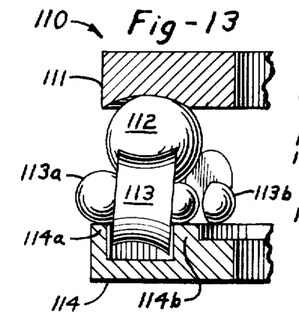
FIG. 13 is a vertical sectional view of the left portion of a device similar to FIG. 12 but with slightly different geometry of the minor rolling elements and retaining rings.

FIG. 13 depicts rolling contact bearing 110 which is similar to device 100 except that ends 113a and 113b of rollers 113 contact retainer rings 114a and 114b on surfaces which are in line with each other. Radial displacement of rollers 113 is precluded by positioning balls 112 in such a way that their points of contact with upper race 111 and rollers 113 is aligned perpendicularly to surfaces 114a and 114b of lower race 104.

Figure 14:
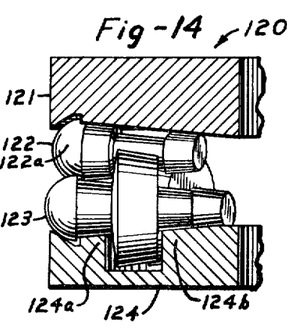
FIG. 14 is a vertical sectional view of the left portion of a device similar to FIG. 12 but wherein the elements are in rolling line contact rather than rolling point contact.

FIG. 14 depicts a device 120 which is similar to device 100 except that line contact roller bearings are provided. Upper race 121 contacts the two wide portions of rollers 122, while end 122a is in rolling point contact with upper race 121 to preclude radially outward movement of rollers 122. The narrow central portion of rollers 122 is in rolling line contact with the broad central portion of rollers 123, whose two narrow portions are in rolling line contact with retainer rings 124a and 124b of lower race 124.

Figure 15:
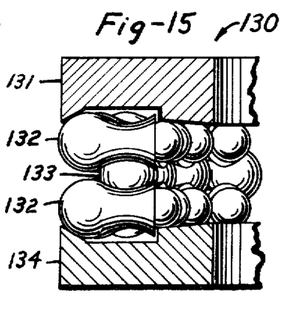
FIG. 15 is a vertical sectional view of the left portion of a device similar to FIG. 12 except that three series of rolling elements are utilized.

FIG. 15 depicts rolling contact device 130 with upper race 131 which is in contact with an upper series of 24 two-ended rollers 132. A middle series of 24 interposed balls 133 which contact the central portions of upper rollers 132 also contact the central portions of each of the 24 rollers 134 of a lower series of rollers, which in turn and in contact with lower race 134, which may be identical in shape to upper race 131.

All of the bearing devices described thus far have been either essentially radial load or essentially axial load. Combination rolling contact radial-axial load devices are quite practical. In bearings subjected to small axial loads, minor modifications to the structure of devices 10, 30, 40 and 90 may be effected. Such modifications would consist of changing the shape of the minor and/or major rolling elements so that they or the locus of their portions which contact the outer race, forms a truncated cone. Thus the retaining rings at each side of the bearing would of necessity be of different diameters.

Figure 16:
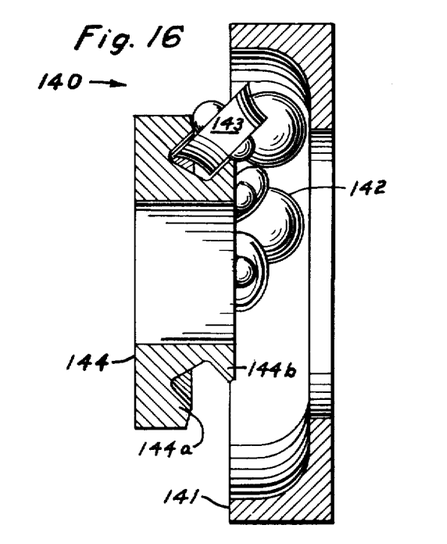
FIG. 16 is a vertical sectional view of combination radial load and axial load bearing intermediate between the devices of FIGS. 4 and 12.

Likewise, when radial loads are small, minor changes to axial load bearings 100, 110, 120 and 130 will accommodate them in addition to the major axial loads.

Where radial and axial loads are essentially equal, the axes of the rolling elements will most preferably be about 45° from the axis of the bearing. Device 40 is probably best suited to this application. By tilting its rolling elements 45°, it obtains the inherent stability of an axial rolling contact bearing and thus the retaining rings no longer need to contact the major series of rollers. FIG. 16 depicts such a combination load bearing 140 and it will be noted that it bears structural similarities to both device 40 and to device 100. In device 140, outer race 141 contacts balls 142 which are interspersed between and contact the broad portions of rollers 143. The rounded ends of rollers 143 contact retaining rings 144a and 144b which in turn are integral with an inner race 144.

Figure 17:
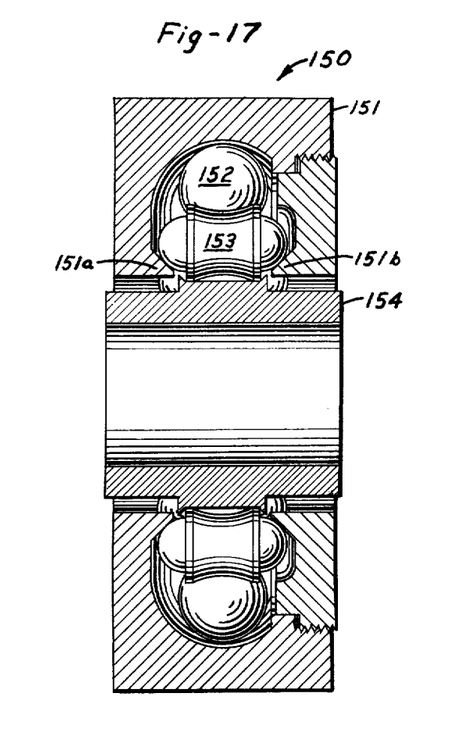
FIG. 17 is a vertical section view of a device similar to that of FIGS. 6 and 7 except that the retainers are part of the outer race and one series of rolling elements is replaced with balls.

Rolling contact bearing 150 of FIG. 17 is similar to device 40 of FIG. 7, except that the retainer rings are attached to the outer race and balls are used instead of rollers as the radially outward set of rolling elements. Device 150 includes outer race 151, which contacts balls 152, which in turn are in rolling contact with inner race 154. Retaining rings 151a and 151b are intergral with outer race 151 and contact terete axial extensions of rollers 153 to hold them radially outwards.

Figure 18:
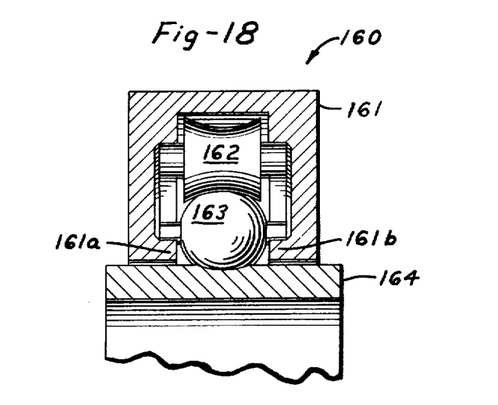
FIG. 18 is a vertical section view of the upper part of a device similar to that of FIG. 17, but with the rolling elements rearranged.

FIG. 18 depicts another device 160 which is similar to that of FIG. 17 except that the two sets of rolling elements are interposed and terete axial extensions have been added to the balls. Device 160 is composed of outer race 161, which is in rolling contact with spools 162, which have balls 163 interposed between them. Balls 163 roll in a shallow groove in inner race 164 and have axial extensions which roll on the outer periphery of retaining rings 161a and 161b and are held radially outward thereby.

Figure 19:
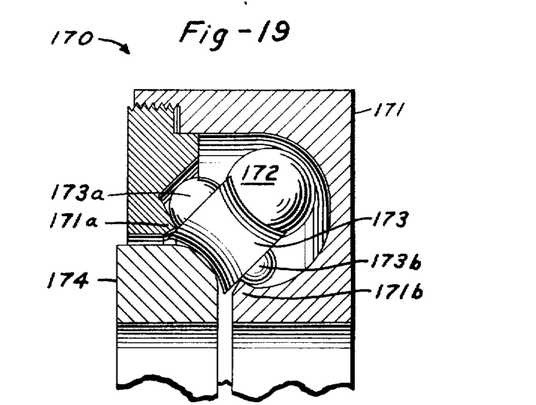
FIG. 19 is a vertical section view of the upper part of a device intermediate between those of FIGS. 16 and 17.

In the device 170 of FIG. 19, the outer race 171 contacts balls 172 which are interspersed between and contact the broad portions of rollers 173. The rounded ends 173a and 173b of rollers 173 contact retaining rings 171a and 171b. Ring 171a is affixed to outer race 171 and retaining ring 171b is intregral with outer race 171. The device 170 is intermediate between those of FIGS. 16 and 17.

Figure 20:
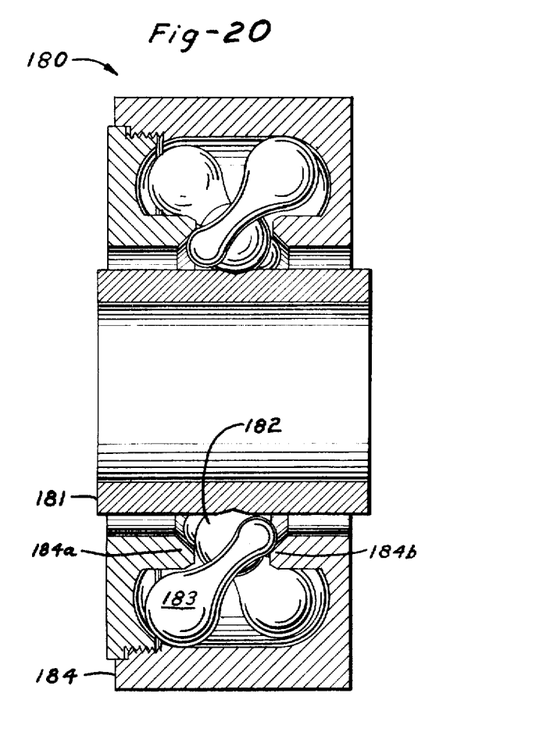
FIG. 20 is a vertical section view of a rolling contact bearing with radial and axial load capabilities, and wherein one set of rolling elements has its alternate elements aligned in opposite directions.

FIG. 20 shows another rolling contact bearing 180 which obtains the inherent stability of axial bearings, such as device 100, in a manner which not only is stable under radial loads, but which will also permit the bearing to accept axial loads from either direction. In conventional bearings, two separate bearings are required for this purpose. Loads are transmitted from race 181, which may have a curved race or be V-notched as depicted, through major rolling elements 182 which are spherical and roll in race 181, to the narrow concave portions of the bowling-pin-shaped secondary rolling elements 183 whose axes lie alternately 45° one way from the axis of the bearing and then 45° the other way. The other race 184 has two concave rounded portions on its inner periphery to accommodate loads transmitted through the broad ends of rollers 183 and has retainers 184a and 184b for the small ends of rollers 183 to ride upon. Retainer 184a may be integral with race 184 or may be threaded in a manner such as that depicted to be removable and adjustable.

In all of the above described embodiments, it may be noted that one set of rolling elements, whether balls, rollers or spools, are major load transfer elements. The other rolling elements, whether balls, rollers or spools, are minor idling elements which also transfer the loads. The minor rolling elements are supported by retainers in the form of rings without contacting a central shaft. The retainers also act as an inner race.

I claim:
1. A rolling device comprising:
   a bearing race having at least one circularly oriented surface,
   first rotating means,
   said first rotating means including at least two rotating elements in rolling contact with said circularly oriented surface of said bearing race,
   second rotating means for positioning said first rotating means relative to said circularly oriented surface of said first bearing race,
   said second rotating means including at least two generally roller-shaped rotating elements alternately interposed between said rotating elements of said first rotating means to prevent their mutual contact and engaging the same in rolling contact,
   and two circular retainer rings respectively engaging the opposite ends of said generally roller-shaped rotating elements in rolling contact and holding the same in position,
   said retainer rings also functioning as the only bearing races for said second rotating means.

2. The rolling contact device as claimed in claim 1 in which:
   the first-named bearing race is radially outwards of said first and second rotating means,
   said generally roller-shaped rotating elements each have an axis lying radially outside a plane through the axes of two first-named rotating elements adjoining the same, and said retainer rings exert radially inward pressure on said generally roller-shaped rotating elements for positioning said first rotating means radially outwards against the first-named bearing race.

3. The rolling contact device as claimed in claim 2 in which said device includes axial extension of at least two elements of one of the rotating means, said axial extension being in rolling contact with a third rotating means for transferring loads and rotary motion, said third rotating means including at least two rotating elements which are held in position against said axial extensions by their rolling contact with a further race.

4. The rolling contact device as claimed in claim 3 including means for holding said further race stationary.

5. The rolling contact device as claimed in claim 3 in which said additional rotating elements have different diameters for causing said further race to oscillate.

6. The rolling contact device as claimed in claim 5 including means for holding said first named race stationary.

7. The rolling contact device as claimed in claim 3 in which both further race and said first-named race are rotatable, and said device is capable of acting as a speed change device.

8. A rolling contact device according to claim 2, wherein said rotating elements of said first rotating means are balls, and said generally roller-shaped rotating elements are spools with concave peripheries engaging the balls.

9. A rolling contact device according to claim 2, wherein said rotating elements of both rotating means are cylindrical.

10. The rolling contact device as claimed in claim 1 in which:

the first-named bearing race is radially outwards of said first and second rotating means, said generally roller-shaped rotating elements each have an axis lying radially inside a plane through the axes of two first-named rotating elements adjoining the same, and said retainer rings exert radially outward pressure on said generally roller-shaped rotating elements for positioning said first rotating means radially outwards against the first-named bearing race.

11. The rolling contact device as claimed in claim 1 in which the first-named rotating elements include balls.

12. The rolling contact device as claimed in claim 1 in which the first-named rotating elements include rollers.

13. The rolling contact device as claimed in claim 12, wherein said retainer rings present radially outwardly-facing bearing races in rolling contact with the ends of said rollers, and radially inwardly-facing bearing races in rolling contact with the ends of said generally roller-shaped rotating elements.

14. The rolling contact device as claimed in claim 1 in which said races are generally plunar for transmission of axial loads, and said first and second rotating means are located between said planar races.

15. The rolling contact device as claimed in claim 14 in which said retaining rings are integral with one of said races.

16. The rolling contact device claimed in claim 14 in which said device includes a third rotating means positioned between said second rotating means and second named race.

17. The rolling contact device as claimed in claim 14 in which at least one of said retainer rings is at an angle to the axes of said generally roller-shaped rotating elements to prevent their radial displacement.

18. The rolling contact device as claimed in claim 1 in which said device further includes a central shaft connected to said retainer rings and free of contact with either of said rotating means.

19. The rolling contact device as claimed in claim 1 including snap rings to prevent axial displacement of elements of said device with respect to each other.

* * * * *